3,167,426
NICKEL-BASE ALLOY

John C. Freche, Parma, Ohio, Thomas J. Riley, Lexington, Ky., and William J. Waters, Cleveland, Ohio, assignors to the United States of America as represented by the Administrator of the National Aeronautics and Space Administration
No Drawing. Filed May 4, 1961, Ser. No. 107,866
4 Claims. (Cl. 75—171)
(Granted under Title 35, U.S. Code (1952), sec. 266)

The invention described herein may be manufactured and used by or for the Government of the United States of America for governmental purposes without the payment of any royalties thereon or therefor.

The present invention relates to a nickel-base alloy capable of high load-carrying capacity at temperatures between 1800° F. and 2000° F. and above.

The structural integrity, as well as the performance of turbojet aircraft rocket-powered missiles, and aerospace vehicles is vitally dependent upon the materials from which the individual components are fabricated. Specific areas are turbojet engine buckets, liquid propellant rocket motor components, such as the turbopump and various structural members of aero-space vehicles. In the operation of today's jet engine, it has been found that suitable turbine blades should preferably have high load-carrying capacity at temperatures of 1800° F. and above in order that increased thrust through operation at higher inlet gas temperatures may be realized. For such an application, a minimum stress rupture life of 100 hours at 15,000 p.s.i. stress, which is comparable to the blade stresses in present day engine turbines, is required. Good impact resistance and good oxidation resistance are also important requirements for such an alloy. In regard to the areo-space field, space vehicles are subjected to varying temperatures which can exceed 2000° F. during the reentry to the earth's atmosphere on their external surfaces, and to temperatures only slightly below this value in some of their internal structural components.

Materials currently capable of high load-carrying capacity at temperatures of 1800° F. and above are ceramics, cermets, refractory metals and their alloys. Each of these materials however, has serious limitations for turbine blade application. Thus, commercial alloys which are not subject to these limitations such as nickel-base and cobalt-base alloys do not have adequate strength at 1800° F. Only a very limited number of these alloys can be utilized under high loads at this temperature for a sufficient length of time to be considered for turbine blade application.

Numerous disadvantages are found to exist in the previously used materials for high temperature, high stress applications. Ceramics are very brittle and lack impact and thermal shock resistance, which prevent them from being used successfully as turbine buckets despite their otherwise good high temperature properties. Cermets are a slight improvement over the ceramics but generally are subject to the same failings as those previously mentioned in relation to the ceramics. High melting point refractory metals can generaly be said to have poor oxidation resistance at elevated temperatures. This can also be said for the alloys of such high melting point refractory metals. Thus, in order to permit their use at elevated temperatures for sufficiently long periods of time, protective coatings are generally required for such metals or their alloys. The problem of providing strongly adherent coatings which give uniform coverage and satisfactory erosion resistance represents a major research effort and has not been solved in a manner suitable to permit coated materials to operate for long periods as turbine bucket materials. The very few commercially-available alloys which can possibly be considered for high-temperature applications need closely controlled vacuum melting techniques in order to achieve the desired properties and, as a result, are hard to manufacture. Extensive research by many investigators has resulted in the development of a variety of nickel-base alloys for elevated temperature applications. These include the Nimonics, the Inconel series, Guy alloy, M-252, the Udimet series, Nicrotung, and many others. Various techniques have been employed to achieve improved elevated-temperature strengths with these nickel base alloys. One innovation has been to utilize vacuum melting techniques which have the effect of reducing impurity content in the melts, thereby generally achieving alloys with improved properties. Another procedure which has increased the elevated temperature strength properties of certain nickel-base alloys was the addition of small quantities of boron and/or zirconium. The addition of prime strengthening elements such as aluminum and titanium to nickel-base alloys has also been utilized in order to form the stable dispersed $Ni_3Al(Ti)$ intermetallic compound phase. This phase provides coherency strengthening of the matrix, acts as a barrier to metal slip under load at high temperature and contributes its strength to that of the alloy. It has been found to be largely responsible for the high strength exhibited in a series of Ni—Cr—Al—Ti alloys and is the basis for the high elevated temperature strengths exhibited by several commercial nickel-base alloys.

Research has been conducted with the objective of providing a series of nickel-base alloys having outstanding advanced temperature characteristics. In brief, a series of cast nickel-base alloys with satisfactory strength and oxidation characteristics at 1800° F. and above has been developed as a result of this research and forms the basis of this invention. A basic alloy was developed which has a composition in weight percent of 8 molybdenum, 6 chromium, 6 aluminum, 1 zirconium, and the balance nickel. A modification of the basic alloys by additions of various elements demonstrated added improvement in elevated temperature strength. However, it was considered desirable to extend the usefulness of this series of alloys by providing both additional elevated temperature strength and, if possible, some degree of workability.

In order to achieve these objectives, alloy studies were continued with the strongest previously developed composition which was a 4% tungsten, 2.5% vanadium, 0.125% carbon modification of the aforementioned basic alloy utilizing tantalum as an alloying additive, while the molybdenum content was reduced to 4%. The most outstanding results were obtained with 8% tantalum additions. It is these aforementioned nickel-base alloys with the tantalum addition that forms this invention.

In view of the foregoing remarks, an object of this invention is to provide an alloy series which demonstrates elevated temperature stress rupture properties greater than most commercial nickel and cobalt base alloys.

Another object of the invention is to provide an alloy series which demonstrates elevated temperature tensile properties greater than most commercial nickel and cobalt base alloys.

Still another object of the herein invention is to provide an alloy series which exhibits workability and still possesses higher elevated temperature strength properties than known commercial nickel and cobalt-base alloys.

One other object of the invention is to provide an alloy series with impact resistance properties which surpass those of commercial high-temperature alloys.

A still further object of the invention is to provide an alloy series which can be readily cast without elaborate vacuum casting facilities.

A further object of the invention is to provide an alloy series which has the combination of properties suitable for gas turbine buckets and turbo-pump components.

An additional object of the disclosed invention is to provide an alloy series having high load-carrying capacity at temperatures in excess of 1800° F.

One further object of the invention is to provide an alloy series which has good oxidation and impact resistance characteristics.

Other objects and many attendant advantages of the present invention will be understood from the following detailed description:

This invention is embodied in alloys having an intermediate composition range within the following broad range:

| Element | Range |
|---|---|
| Nickel | From about 60% to about 75%. |
| Molybdenum | From about 0% to about 10%. |
| Tungsten | From about 0% to about 10%. |
| Aluminum | From about 4% to about 8%. |
| Chromium | From about 4% to about 8%. |
| Zirconium | From about .5% to about 3%. |
| Vanadium | From about 1% to about 7%. |
| Carbon | From about .05% to about 1.0%. |
| Tantalum | From about 3% to about 12%. |

In the alloy composition set forth, molybdenum and tungsten can be used interchangeably so that equal amounts of each may be present or just one element alone. However, either the tungsten or the molybdenum must be present individually or in combination in a quantity of at least 6% and the total amount of either element used separately or the combination of the two elements should not exceed 10% of the alloys.

A preferred alloy has the following composition:

| Element | Percent |
|---|---|
| Nickel | About 70.375 percent. |
| Molybdenum | About 8 percent. |
| Chromium | About 6 percent. |
| Aluminum | About 6 percent. |
| Zirconium | About 1 percent. |
| Vanadium | About 2.5 percent. |
| Carbon | About .125 percent. |
| Tantalum | About 6 percent. |

Thus, a more preferred alloy has the following composition:

| Element | Percent |
|---|---|
| Nickel | About 68.375 percent. |
| Molybdenum | About 4.0 percent. |
| Tungsten | About 4.0 percent. |
| Chromium | About 6.0 percent. |
| Aluminum | About 6.0 percent. |
| Zirconium | About 1.0 percent. |
| Vanadium | About 2.5 percent. |
| Carbon | About .125 percent. |
| Tantalum | About 8.0 percent. |

The subject alloys were prepared by one of the simplest casting techniques. Melt was made in a refractory crucible which was placed in a high frequency water-cooled induction coil which was powered by a 50 kilowatt, 10,000 c.p.s. power unit. A compact of vanadium, carbon, and tungsten is placed inside an aluminum foil container. This compact is then placed in the cold crucible with ⅓–⅕ of the total amount of the nickel. The aforegoing mixture is melted and the remainder of the nickel is added and melted. Finally, the tantalum, chromium, molybdenum, and aluminum is added and the melt is brought to its temperature. The zirconium can be picked up as a contaminant in the stabilized zirconium crucible used. Argon gas was directed into the open top crucible continuously during melting to provide an inert gas blanket over the melt. During pouring, which was done at 3150° F. plus or minus 50° F., the inert gas coverage was removed. Melts were hand poured into investment molds heated to 1600° F. and were permitted to come to equilibrium temperature naturally without speeding up the cooling process artificially. The lost-wax process was employed to make molds of stress rupture and tensile bars, cylindrical bars, and impact bars. These alloys may also be prepared by more complex techniques such as closely-controlled vacuum melting which can result in further improvements in their properties. In other instances research has indicated that the improved cleanliness plus the fact that the effectiveness of such an element as aluminum is not reduced by the reaction with atmospheric gases can also result in better strength, as well as improved ductility.

The alloys of this invention display a fine dispersion of particles. It is believed that a variety of strengthening mechanisms are active. Aluminum-nickel intermetallic compound Ni$_3$Al, which is stable at high temperatures, is formed. It is probable that vanadium acts to form a complex vanadium-aluminum-nickel intermetallic compound. In addition, vanadium, tantalum, and tungsten alloying additives also tend to form fairly stable carbide particles. It is also possible that a solution strengthening may occur as a result of the tantalum and tungsten additions. The zirconium probably tends to retard the rate at which the intermetallic phase is depleted from the matrix adjacent the grain boundaries. Although this alloy is primarily a cast material, it also shows good workability.

TABLE I

*Nominal chemical compositions*

| Alloy | C | Mn | Si | Cr | Ni | Co | Ta | Mo | W | Cb | V | Ti | Al | Fe | Zr | B |
|---|---|---|---|---|---|---|---|---|---|---|---|---|---|---|---|---|
| Guy | .1 | .5 | .5 | 13.5 | Bal. | | | 5.5 | | 2.0 | | | 6.2 | 4.5 | | .5 |
| J-1500 | .15 | | | 20.0 | Bal. | | | 10.0 | | | | 3.0 | 1.0 | | | |
| René 41 | .09 | | | 19.0 | Bal. | 11.0 | | 10.0 | | | | 3.1 | 1.5 | | | |
| I-1360 | .10 | | | 10.0 | 70.5 | | | 5.0 | | 2.0 | | | 6.0 | 4.5 | | .3 |
| Inco 713 | .12 | .15 | .4 | 13.0 | Bal. | | | 4.5 | | 2.25 | | .6 | 6.0 | 1.0 | | |
| Alloy I | .125 | | | 6.0 | Bal. | | | 8.0 | | | | 1.5 | 6.0 | | 1.0 | |
| Alloy II | .125 | | | 6.0 | Bal. | | | 4 | 4 | | 2.5 | | 6.0 | | 1.0 | |
| New Alloy | .125 | | | 6.0 | Bal. | | 8 | 4 | 4 | | 2.5 | | 6.0 | | 1.0 | |

Table I sets forth the several commercially-available alloys which have similar chemical compositions to those disclosed herein. Alloy I, as set forth in the table, is that alloy disclosed in Patent No. 2,971,838 and Alloy II is the alloy disclosed in Patent No. 2,971,837. The present alloy of this invention referred to as the New Alloy is essentially the composition disclosed in Alloy II with the addition of tantalum thereto. As previously discussed, through extensive research efforts, it was found that the addition of tantalum in the quantities stated, gave unexpectedly improved properties to the existing Alloy II. These greatly improved results can be seen in Table II which sets forth the rupture strength and impact resistance of the New Alloy, as compared to those disclosed in Table I and particularly points out the greatly-improved results over Alloy II.

TABLE II

*Rupture life comparisons at 15,000 p.s.i. in hours*

| Alloy | 1,900° F. | 1,800° F. |
|---|---|---|
| Guy | 10 | 50 |
| J-1500 | 10 | 20 |
| René 41 | 20 | 50 |
| I-1360 | 10 | 20 |
| Inco 713 | 30 | 140 |
| Alloy I |  | 370 |
| Alloy II | 101 | 800 |
| New Alloy | 185 | 1,200 |

It can readily be seen with reference to Table II that the New Alloy has a rupture life that far exceeds any of the similar commercially-available materials and is a considerable improvement over both Alloys I and II. The commercial alloy which most closely approaches the rupture life of the New Alloy is Inco 713 which has a rupture life at 1900° F. of less than 30 hours, as compared to 185 hours for the New Alloy, and has a rupture life of 140 hours at 1800° F., as compared to 1200 hours for the New Alloy. Additionally, it can be seen that the New Alloy far exceeds the Inco 713 in rupture strength. Furthermore, the rupture life at 15,000 p.s.i. and at 1850° F. for the New Alloy was found to be 560 hours. Additional indications of the ductility of the New Alloy are indicated in various test runs in which the impact resistance is the as-cast unnotched condition at room temperature was recorded and in these tests the impact resistance was greater than 62.5 inch-pounds which was the limit of the apparatus for making the test. Thus, this indicates that the New Alloy possesses an impact resistance at least equal to that of Alloys I and II which recorded impact resistances greater than 62.5 inch-pounds.

TABLE III

| Alloy | Temperature, ° F. | Ultimate Tensile Strength, p.s.i. | Elongation, percent |
|---|---|---|---|
| New Alloy | Room | 134,400 | 5.2 |
|  | 1,800 | 80,000 | 5.5 |
|  | 1,900 | 54,300 | 9.5 |
|  | 2,000 | 49,200 | 7.2 |
| Alloy I | Room | 106,000 | .90 |
|  | 1,800 | 56,200 | 4.8 |
| Alloy II | Room | 113,000 | 1.6 |
|  | 1,800 | 66,900 | 4.1 |

With reference to Table III wherein the tensile date of the new alloy, as compared to Alloys I and II, as disclosed, it can readily be seen that the New Alloy possesses unusually high ultimate tensile strength and shows a considerable increase, as compared to both the other two alloys shown therein. The elongation percent increase is an important feature of this New Alloy in that it indicates its workability potential, as compared to Alloys I and II. The values given in Table III were of the alloys in an as-cast condition. To indicate the degree of workability of the New Alloy buttons of this alloy 0.20 inch thick and ¾-inch in diameter were rolled at room temperature, 1200° F. and 2100° F. The faces of all buttons were machine ground. Three methods of reduction were employed at each temperature. The first provided a one-percent reduction from the initial thickness per pass, the second provided a two-percent reduction for each of the first two passes, followed by one-percent reduction per pass thereafter. The final method employed a four-percent reduction per pass. The data obtained indicate that the alloys have sufficient ductility to permit fairly substantial reduction in thickness of the rolling samples. A reduction of 23 percent at 1200° F. was obtained without observing any cracks. Additionally, forging data was obtained with as-cast vapor-blasted cylindrical rods in a 4500-pound drop forge. No cracks were noted in the bars with a maximum diameter change in the ¾-inch forging bars of approximately 29 percent without stress relieving. Thus, it can readily be seen that the New Alloy, in addition to possessing unusually high stress-rupture and impact properties, possesses a good degree of workability which augments its potential use as a structural component in a variety of advanced-temperature applications.

Having thus described this invention in such full, clear, concise, and exact terms as to enable any person skilled in the art to which it pertains to make and use the same and having set forth the best mode contemplated of carrying out this invention, it is stated that the subject mater which is regarded as being the invention is particularly pointed out and distinctly claimed in what is claimed, it being understood that equivalents or modifications of, or substitutions for, parts of the above specifically-described embodiments of the invention may be made without departing from the scope of the invention, as set forth in what is claimed.

What is claimed is:

1. The nickel-base alloy consisting essentially of 60 to 75% nickel, molybdenum and tungsten in combination such that the total amount of both elements present in the alloy is from 6 to 10%, 4 to 8% aluminum, 4 to 8% chromium, 0.5 to 3% zirconium, 1 to 7% vanadium, 0.05 to 1.0% carbon, and 3 to 12% tantalum.

2. The nickel-base alloy consisting essentially of 70.375% nickel, 8% molybdenum, 6% chromium, 6% aluminum, 1% zirconium, 2.5% vanadium, 0.125% carbon, and 6% tantalum.

3. The nickel-base alloy consisting essentially of 70.375% nickel, 4% molybdenum, 4% tungsten, 6% chromium, 6% aluminum, 1% zirconium, 2.5% vanadium, 0.125% carbon, and 6% tantalum.

4. The nickel-base alloy consisting essentially of 68.375% nickel, 4% molybdenum, 4% tungsten, 6% chromium, 6% aluminum, 1% zirconium, 2.5% vanadium, 0.125% carbon, and 8% tantalum.

References Cited by the Examiner

UNITED STATES PATENTS

| | | | |
|---|---|---|---|
| 2,266,318 | 12/41 | Heller | 75—171 |
| 2,543,841 | 3/51 | Foley | 75—171 |
| 2,912,323 | 11/59 | Bieber et al. | 75—171 |
| 2,920,956 | 1/60 | Nisbet et al. | 75—171 |
| 2,971,837 | 2/61 | Freche | 75—171 |
| 2,971,838 | 2/61 | Freche | 75—171 |
| 2,994,605 | 8/61 | Gill et al. | 75—171 |

FOREIGN PATENTS

| | | |
|---|---|---|
| 493,718 | 6/53 | Canada. |
| 547,402 | 10/57 | Canada. |
| 1,160,309 | 2/58 | France. |
| 652,061 | 10/37 | Germany. |
| 695,241 | 8/40 | Germany. |
| 583,807 | 12/46 | Great Britain. |

DAVID L. RECK, *Primary Examiner.*

MARCUS U. LYONS, WINSTON A. DOUGLAS,
*Examiners.*